United States Patent
Cancedda et al.

(10) Patent No.: US 8,798,984 B2
(45) Date of Patent: Aug. 5, 2014

(54) METHOD AND SYSTEM FOR CONFIDENCE-WEIGHTED LEARNING OF FACTORED DISCRIMINATIVE LANGUAGE MODELS

(75) Inventors: Nicola Cancedda, Grenoble (FR); Viet Ha-Thuc, Coralville, IA (US)

(73) Assignee: Xerox Corporation, Norwalk, CT (US)

( * ) Notice: Subject to any disclaimer, the term of this patent is extended or adjusted under 35 U.S.C. 154(b) by 746 days.

(21) Appl. No.: 13/094,999

(22) Filed: Apr. 27, 2011

(65) Prior Publication Data

US 2012/0278060 A1    Nov. 1, 2012

(51) Int. Cl.
G06F 17/20 (2006.01)
G06F 17/28 (2006.01)
G10L 15/06 (2013.01)

(52) U.S. Cl.
CPC ............ G06F 17/2818 (2013.01); G10L 15/06 (2013.01); G10L 18/197 (2013.01)
USPC .................................................. 704/2; 704/9

(58) Field of Classification Search
CPC ......................... G06F 17/2818; G06F 17/2854
USPC ........................................................ 704/2, 9
See application file for complete search history.

(56) References Cited

U.S. PATENT DOCUMENTS

| | | | |
|---|---|---|---|
| 6,182,026 B1 | 1/2001 | Tillmann et al. | |
| 6,917,936 B2 | 7/2005 | Cancedda | |
| 2004/0024581 A1 | 2/2004 | Koehn et al. | |
| 2004/0030551 A1 | 2/2004 | Marcu et al. | |
| 2005/0137854 A1* | 6/2005 | Cancedda et al. | 704/9 |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0262826 A1 | 10/2008 | Pacull | |
| 2008/0300857 A1 | 12/2008 | Barbaiani et al. | |
| 2009/0175545 A1 | 7/2009 | Cancedda et al. | |
| 2009/0177460 A1* | 7/2009 | Huang et al. | 704/2 |
| 2010/0004920 A1* | 1/2010 | Macherey et al. | 704/4 |
| 2010/0023315 A1* | 1/2010 | Quirk | 704/3 |
| 2010/0274552 A1* | 10/2010 | Gao et al. | 704/2 |
| 2011/0178791 A1* | 7/2011 | Stymne et al. | 704/2 |
| 2012/0253783 A1* | 10/2012 | Castelli et al. | 704/3 |

OTHER PUBLICATIONS

Arun, et al. "Online learning methods for discriminative training of phrase based statistical machine translation." Proc. of MT Summit XI 2.5 (2007), pp. 1-6.*

(Continued)

Primary Examiner — James Wozniak
(74) Attorney, Agent, or Firm — Fay Sharpe LLP (57) ABSTRACT

A system and method for building a language model for a translation system are provided. The method includes providing a first relative ranking of first and second translations in a target language of a same source string in a source language, determining a second relative ranking of the first and second translations using weights of a language model, the language model including a weight for each of a set of n-gram features, and comparing the first and second relative rankings to determine whether they are in agreement. The method further includes, when the rankings are not in agreement, updating one or more of the weights in the language model as a function of a measure of confidence in the weight, the confidence being a function of previous observations of the n-gram feature in the method.

27 Claims, 5 Drawing Sheets

(56) References Cited

OTHER PUBLICATIONS

Chiang, et al. "Online large-margin training of syntactic and structural translation features." Proceedings of the Conference on Empirical Methods in Natural Language Processing. Association for Computational Linguistics, Oct. 2008, pp. 224-233.*

Foster, et al. "Discriminative instance weighting for domain adaptation in statistical machine translation." Proceedings of the 2010 Conference on Empirical Methods in Natural Language Processing. Association for Computational Linguistics, Oct. 2010, pp. 451-459.*

Goh, et al. "Discriminative reranking for smt using various global features." Universal Communication Symposium (IUCS), 2010 4th International. IEEE, Oct. 2010, pp. 8-14.*

Hayashi, Katsuhiko, et al. "Structural support vector machines for log-linear approach in statistical machine translation." Proceedings of IWSLT, Tokyo, Japan, Dec. 2009, pp. 141-151.*

Ittycheriah, et al. "Direct Translation Model 2." HLT-NAACL. Apr. 2007, pp. 57-64.*

Chiang, et al. "11,001 new features for statistical machine translation." Proceedings of Human Language Technologies: The 2009 Annual Conference of the North American Chapter of the Association for Computational Linguistics. Association for Computational Linguistics, Jun. 2009, pp. 218-226.*

Liu, et al. "Source-Language Features and Maximum Correlation Training for Machine Translation Evaluation." HLT-NAACL. vol. 7. Apr. 2007, pp. 41-48.*

Niehues, et al. "A POS-based model for long-range reorderings in SMT." Proceedings of the Fourth Workshop on Statistical Machine Translation. Association for Computational Linguistics, Mar. 2009, pp. 206-214.*

White, et al. "Perceptron reranking for CCG realization." Proceedings of the 2009 Conference on Empirical Methods in Natural Language Processing: vol. 1-vol. 1. Association for Computational Linguistics, Aug. 2009, pp. 410-419.*

Liu, Yang et al. "Discriminative word alignment by linear modeling." Computational Linguistics 36.3, 2010, pp. 303-339.*

Ait-Mokhtar, et al. "A multi-input dependency parser," in Proceedings of the Seventh International Workshop on Parsing Technologies, 2001.

Papineni, et al. "BLEU: a method for automatic evaluation of machine translation," in *ACL-2002: 40th Annual meeting of the Association for Computational Linguistics*, 2001, pp. 311-318.

Bilmes, et al. "Factored language models and generalized parallel backoff," in Proceedings of HLTINAACL, 2003.

Crammer, et al. Online passive-aggressive algorithms. Journal of Machine Learning Research, 7, 2006.

Dredze, et al. "Confidence-weighted linear classifiers," in Proceedings of ICML, 2008.

Li, et al. "Large-scale discriminative n-gram language models for statistical machine translation," in Proceedings of AMTA, 2008.

Mahé, et al. "Linguistically enriched word-sequence kernels for discriminative language modeling," in Learning Machine Translation, NIPS Workshop Series, 2009.

Och, et al. "Discriminative training and maximum entropy models for statistical machine translation," in Proceedings of the Annual Meeting of the Association for Computational Linguistics, 2002.

U.S. Appl. No. 12/690,504, filed Jan. 1, 2010, Stymne, et al.

U.S. Appl. No. 12/814,657, filed Jun. 14, 2010, Hanneman, et al.

U.S. Appl. No. 12/911,252, filed Oct. 25, 2010, Roth, et al.

Roark, et al. "Discriminative language modeling with conditional random fields and the perceptron algorithm," in Proceedings of the annual meeting of the Association for Computational Linguistics (ACL), 2004.

Roark, et al. Discriminative n-gram language modeling. Computer Speech and Language, 21(2), 2006.

Simard, et al. "Translating with non-contiguous phrases," in Association for Computational Linguistics, editor, Proceedings of Human Language Technology Conference and Conference on Empirical Methods in Natural Language, p. 755-762, Oct. 2005.

* cited by examiner

METHOD AND SYSTEM FOR CONFIDENCE-WEIGHTED LEARNING OF FACTORED DISCRIMINATIVE LANGUAGE MODELS

BACKGROUND

The exemplary embodiment relates to the field of machine translation. It finds particular application in connection with learning language models using weights and confidences for use in a machine translation system.

Statistical machine translation (SMT) systems are used for automatic translation of source text in a source language to target text in a target language. They are often based on a standard noisy-channel model which models the probability that a target string, such as a sentence, will be found, given a source string:

$$p(t|s) \propto p(s|t)p(t) \qquad (1)$$

where s and t are source and target language sentences, respectively. The conditional distribution of the source s given the target t (p(s|t)) is referred to as a translation model and the prior probability distribution over target sentences p(t) is called a language model. Language models are widely used components in most statistical machine translation systems, where they play a valuable role in promoting output fluency.

Statistical translation systems often generalize the translation model by log-linear models that allow for the addition of more features. The language model remains, however, the main vehicle by which fluency is promoted. Generative models and discriminative models have been proposed for the language model. N-gram generative language models are commonly used to equate fluency to a likelihood estimate based on n-th order Markov assumptions:

$$p(t) = \Pi_{i=1}^{|t|}(t_i|t_{i-1}, \ldots, t_{i-N+1}) \qquad (2)$$

which estimates the probability of observing a target sentence given prior observations. However, such language models often rely on word surface forms only, and are unable to benefit from available linguistic knowledge sources. Moreover, these language models tend to suffer from poor estimates for rare features (e.g., features that are relevant but which rarely occur).

Accordingly, it would be desirable to have a mechanism for learning language models that utilizes existing linguistic knowledge and which is able to take into account rare features.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; U.S. application Ser. No. 12/690,504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.; Ser. No. 12/814,657, filed on Jun. 14, 2010, entitled WORD ALIGNMENT METHOD AND SYSTEM FOR IMPROVED VOCABULARY COVERAGE IN STATISTICAL MACHINE TRANSLATION, by Gregory Hanneman, et al.; and Ser. No. 12/911,252, filed on Oct. 25, 2010, entitled MACHINE TRANSLATION USING OVERLAPPING BIPHRASE ALIGNMENTS AND SAMPLING, by Benjamin Roth, et al.

Methods for building libraries of parallel corpora from which parallel sentences and bilingual dictionaries can be generated are disclosed, for example, in U.S. Pub No. 2008/0262826, published Oct. 23, 2008, entitled METHOD FOR BUILDING PARALLEL CORPORA, by Francois Pacull.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 2009/0175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

BRIEF DESCRIPTION

In accordance with one aspect of the exemplary embodiment, a method for building a language model for a translation system is provided. The method includes providing a first relative ranking of first and second translations in a target language of a same source string in a source language. A second relative ranking of the first and second translations is determined using weights of a language model. The language model includes a weight for each of a set of n-gram features. The first and second relative rankings are compared to determine whether they are in agreement. When the rankings are not in agreement, one or more of the weights in the language model is updated as a function of a measure of confidence in the weight. The confidence is a function of previous observations of the n-gram feature in the method.

In accordance with another aspect of the exemplary embodiment, a system for building a language model for a translation system is provided. The system includes memory having a first ranking component which provides a first relative ranking for first and second translations in a target language of a same source string in a source language, based on a scoring metric. The system also includes a second ranking component which provides a second relative ranking for the first and second translations based on a language model. The language model includes a set of weights one weight for each of a set of n-gram features. The system further includes a comparison component which compares the first and second relative rankings and, where the first and second relative rankings are not in agreement, updates at least one of the weights in the language model for an n-gram feature identified in at least one of the first and second translations. The updating is based on a measure of confidence in the at least one weight. The confidence is a function of previous observations of the n-gram feature in the method. A processor implements the first ranking component, second ranking component, and comparison component.

In accordance with another aspect of the exemplary embodiment, a method for updating weights in a language model is provided. The method includes providing a language model in memory which includes a vector of weights, one weight for each of a set of n-gram features. A confidence measure is associated with each weight. For first and second of translations of the same source sentence, the first sentence being the more positively ranked of the translations, the method performs a set of operations based on a translation scoring metric. The set of operations includes computing an n-gram feature vector for each of the first and second translations, each n-gram feature vector representing a number of occurrences in the respective translation, of n-gram features having a weight in the translation model. A difference vector is computed by subtracting the n-gram feature vector of the second translation from the n-gram feature vector of the first translation. A function of the difference vector and the vector of weights is computed. Where the computed function has a value which does not at least equal a predetermined threshold, the method updates the vector weights based on the difference vector and confidence measures, and updates the confidence measures to reflect observations of the n-gram features in the first and second translations. The method then repeats the computing of an n-gram feature vector at least once with at least one of a different pair of first and second of translations of the same source sentence and first and second of translations of a new source sentence.

DETAILED DESCRIPTION

Aspects of the exemplary embodiment relate to a system and method for determining a language model based on weight and confidence values corresponding to individual n-grams (corresponding to sequences of n words, where n can be, for example, two, three, four or five). The language model comprises a set of n-grams (or, more specifically, n-gram factored features), weights for the n-grams, and confidences for the weights. That is, each n-gram of the language model has a corresponding weight, wherein each weight is a measure of how fluent a translation including the n-gram is likely to be. Weights are positive if an n-gram is a good indicator that a particular translation containing the n-gram is fluent, and negative if the n-gram is a good indicator that a particular translation is not fluent. The larger the weight (in either the positive or negative direction), the better the indicator. The confidence for each n-gram weight in the language model is a measure of the reliability of the weight. For example, a weight for an n-gram in a language model will have a higher confidence if the n-gram is processed more often in a language model learning algorithm.

Factored Features

By way of information, statistical machine translation (SMT) systems typically integrate an n-gram based generative language model over word surface forms in their log-linear models. Values of n between 3 and 5 are most common. The SMT estimates and smoothes relative frequency counts of n-grams to determine conditional probabilities.

In the exemplary language model, discriminative learning is used for language modeling rather than generative learning. Instead of estimating likelihood, the discriminative learning approach models fluency directly. In one embodiment, the discriminative learning considers language modeling as a binary classification problem which discriminates between fluent and non-fluent translations. In this embodiment, discriminative learning operates on prior labeled fluent (i.e., "positive" or "good") translations, and non-fluent (i.e., "negative" or "bad") translations of a source sentence. As will be appreciated, rather than a binary labeling, sentences may be classified into three, four, or more classes of fluency.

The labeling of the translations as fluent or not fluent may be performed either manually or automatically. Because labeling of training data is expensive when performed manually (such as by human experts), automatic methods of labeling training sets can be performed to provide large sets of training data (i.e., a large set of fluent and non-fluent translations for a plurality of sources). The automation of the labeling tends to cause some translations to be mislabeled, which provides a "noisy" label data set. Additionally, even when training data is labeled manually, there may be translations that are mislabeled, since human experts may disagree as to how to label the translations.

A shortcoming of current language models is that standard n-gram weight estimation methods tend to underestimate the weight of rare, yet relevant, n-grams. The exemplary method and system provided herein can overcome this limitation by combining factored language models with discriminative learning while measuring the confidence of each weight. This approach can be simpler and perform better than other known approaches to the same problem, and works well when the labeling of training data is noisy. Specifically, the exemplary embodiment uses factored features to capture linguistic patterns and discriminative learning for directly modeling fluency. This approach utilizes highly overlapping and correlated factored features, and relies on the robustness of the selected learning algorithms to handle them. The combination of factored features and discriminative learning handles noisy labels rather well. The exemplary factored language model represents each word occurrence in a translation by multiple factors such as part-of-speech (POS), lemma (root) form, and surface form. The factored language model can capture linguistic patterns in the target language at different levels of abstraction.

Factored features, as used herein, are n-gram features where each component in the n-gram can be characterized by different linguistic dimensions of words including, but not limited to, surface forms, lemmas, POS, word roots, and refined POS with morphological information (e.g., noun-singular, noun-plural, verb-present, verb-infinitive, etc). Each of these dimensions is referred to as a factor. In the exemplary embodiment, a translation string, such as a sentence, is represented as a vector over all possible n-gram factored features (or at least a large set or all of those factored features which have been recognized in a corpus of target text strings).

Figure 1:
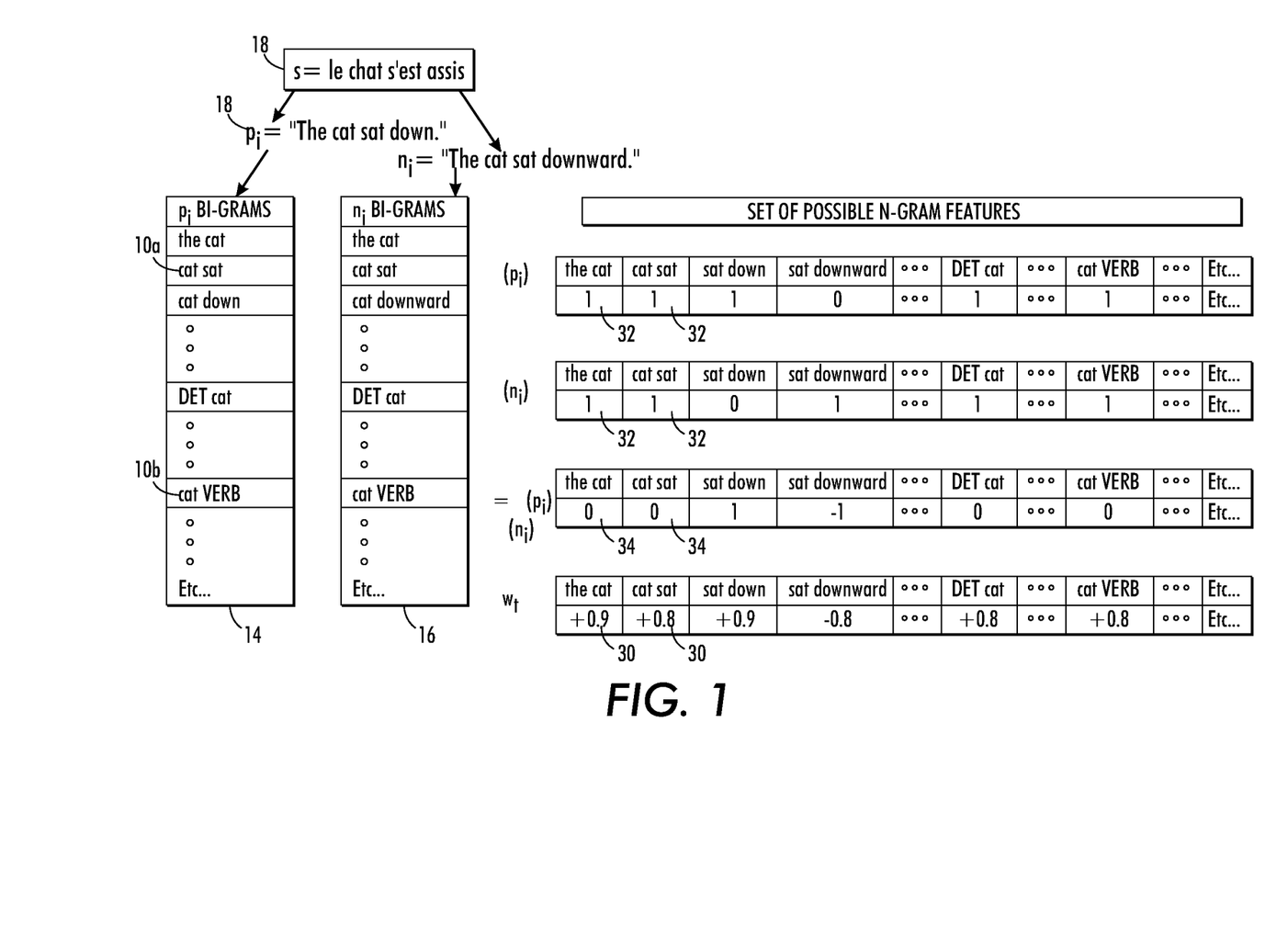
FIG. 1 illustrates the composition of an example source string, positive and negative translations of the source string, and data structures employed by the exemplary method and system.

An example of a factored feature is "pick PRON up", where PRON is the part of speech tag for pronouns and can read on any trigram which has a pronoun between pick and up, such as "pick him up" or "pick it up". Appropriately weighted, this feature can capture the fact that in English the pattern of "pick PRON up" is often fluent. Surface form n-gram features like "pick her up", "pick me up", etc, may also be used. However, the feature "pick PRON up" generalizes the pattern effectively. On the other hand, this feature can be more precise than the corresponding POS n-gram feature "VERB PRON PREP," since the latter also promotes undesirable patterns such as "pick PRON off" and "go PRON in." Accordingly, constructing features with components from different abstraction levels allows better capturing of linguistic patterns. For example, FIG. 1 illustrates an example of an n-gram factored feature 10a having only surface forms and n-gram factored feature 10b is an n-gram having a surface form and a POS as factored features. In other words, the linguistic properties of the bigram "cat sat" 10a may be represented as the n-gram factored feature "cat VERB" 10b.

With respect to discriminative learning of language models, an extension of an online discriminative learning method using confidence-weighted learning is employed. The present method helps to overcome the problem of underestimating the weights of rare features. Confidence-weighted learning stores confidence measures for current estimated feature weights. Less frequently observed features typically have a lower confidence measure and benefit from more aggressive updates of the corresponding weights.

In another aspect of the exemplary embodiment, the confidence weighted learning is extended with a soft margin to specifically handle cases where training data labels are noisy. Noisy labels can occur in language modeling, since positive and negative translations may be obtained by indirect means and with low reliability.

The exemplary system can use a conventional POS tagger. POS taggers are widely available, especially for English and include a finite set of tags, such as noun, verb, adverb, etc. Since POS tag-sets are typically four or five orders of magnitude smaller than word dictionaries, it is possible for n to be up to 7 and more. However, selecting a high value of n can be computationally expensive in the present case, since the number of n-grams for every possible combination of factors is linear to the length of the string. The number of feature combinations is proportional to the number of factors exponentiated to the power given by the size of the n-gram. For example, if three factors are considered with respect to bi-grams, then there are 9 possible combinations of bi-gram factored features, multiplied by the number of bi-grams in a given string. In a simple four-word sentence which generates three surface form bi-grams, for example, the sentence may have up to 27 of such factored features.

The exemplary method and system uses tri-gram factored features to learn a discriminative language model for a selected natural language, such as English, where each word of the n-gram is characterized by, for example, three factors. These factors, by way of example, can be surface form, POS, and extended POS. The surface form is the exact form of the words in the sentence. The POS is the POS tags applied by a POS tagger selected from noun, verb, adverb, etc. The extended POS is a more fine-grained POS tagging in which the tagset is much larger. For extended POS, the POS tags can be further refined in a manner illustrated in Table 1. In other words, each element of an n-gram is a surface from, a POS, or an extended POS. In other embodiments, bi-grams or any other size of n-grams may be used for any given language, as well as differing n-gram features.

TABLE 1

Extended tag set used for the third factor (extended POS) in the exemplary discriminative language model.

| POS | Extended POS |
|---|---|
| Noun | SingNoun |
| | PlurNoun |
| Pronoun | SingThirdPersonPronoun |
| | OtherPronoun |
| Verb | InfinitiveVerb |
| | ProgressiveVerb |
| | SimplePastVerb |
| | PastParticipleVerb |
| | SingThirdPersonVerb |
| | OtherVerb |

Discriminative Training

For the discriminative learning task, identified positive (fluent) and negative (non-fluent) translations are provided. In the exemplary embodiment, a large dataset of sentences labeled as either fluent or non-fluent is automatically provided by an underlying SMT system. The training dataset should be sufficiently large to ensure sufficient lexical coverage and prevent overfitting. While confidence-weighting is introduced to partially compensate for feature sparsity, too limited a lexical coverage may be undesirable. On the other hand, manual fluency annotation on a large dataset may be impractical and could reduce the applicability of the method, although it is contemplated that some or all of the training data may have been manually labeled.

In the exemplary embodiment, positive and negative translations are identified from n-best lists obtained from the underlying SMT system, based on sentence-level measures according to a bilingual translation scoring metric, such as the BLEU score. The exemplary method and system compensates for errors in the BLEU score through the use of confidence-weighted metrics, and optionally a soft-margin extension, as discussed below. For further details on the BLEU scoring algorithm, see, Papineni, K., Roukos, S., Ward, T., and Zhu, W. J. (2002). "BLEU: a method for automatic evaluation of machine translation" in ACL-2002: 40th Annual meeting of the Association for Computational Linguistics pp. 311-318. Another objective function which may be used as the translation scoring metric is the NIST score.

An online learning algorithms for linear models can be used as it scales well to large datasets and thus is useful for discriminative language modeling. Online learning algorithms, such as a perceptron and passive aggressive (PA) algorithm can be used, however, they are modified as described below.

The conventional perceptron/PA method receives as input a training data set of fluent and non-fluent translations of the same source sentence. At each iteration, the algorithm considers a pair of translated sentences from fluent and non-fluent sets, respectively. If the current feature weights incorrectly rank the pair, the weights are updated by increasing the weights of features appearing in the positive translation and decreasing weights of features appearing in the negative translation. In conventional online learning algorithms such as the perceptron/PA approach, common features have weights that tend to be updated often, and so these weights eventually have good estimates. However, infrequent features are seldom updated, which causes the weights of the infrequent features to be underestimated. For any given training data set, features may be numerous and be strong indicators of fluency or non-fluency whenever they appear in a translation. A large number of these features may cause a heavy tailed effect with respect to the frequency and relevance of any given feature. In factored language models, the issue is exacerbated since features are processed at different levels of abstractions. For example, a factored feature composed of common parts-of-speech is by far more frequent than a factored feature composed of rare words and lemmas.

Consider, for example, the following pair of fluent (p) and non-fluent (n) translations of a same source sentence output by a translation system:
p="Unfortunately, we were evaluated not to be able to achieve this." and
n="Unfortunately, we evaluated were not to be able to achieve this."

If this pair of sentence translations is mis-ranked by the language model (i.e., the language model considers the n translation to be a better translation than the p translation), and assuming that tri-gram factored features are used (such as "unfortunately we evaluated", "we evaluated were" and "evaluated were not"), a conventional perceptron/PA online learning algorithm equally decreases weights of all features appearing in n and not in p. However, in this case, the ranking error of the language model is due to the presence of the features "we evaluated were" and "evaluated were not." The first feature "unfortunately we were" (and its factored generalizations such as "unfortunately we PP" and "unfortunately PRON PP" etc.) are not the cause of the translation being non-fluent.

The conventional online learning algorithm considers only one instance pair at a time and has no memory of past instances besides the current weight vector, i.e., is memoryless. The conventional perceptron/PA algorithm does not take into account the possibility that features such as "we evaluated were" and "evaluated were not" are good indicators of a lack of fluency. Because these features are infrequent, their corresponding weights in the conventional language model are rarely updated. If these misclassified (e.g., incorrectly weighted) features occur sufficiently late in the training data of the online algorithm, it is likely that the mis-ranking by the language model is not due to the estimated weights for the frequent features "unfortunately we evaluated" and "unfortunately we PP," but rather is due to poor weight estimation for the features "we evaluated were" and "evaluated were not." This is a result of too few weight updates for the rare features coupled with adjusting the weight of the rare features by an insufficient amount once they are encountered by the algorithm. In the present method, a confidence-weighted learning algorithm is used, which can alleviate this problem.

Confidence-Weighted Learning

The exemplary method may employ a passive-aggressive (PA) method modified to address the issues described above by replacing point estimates for feature weights with non-correlated Gaussian distributions over weights, where a smaller variance implies higher confidence that the real weight lies around the mean. Furthermore, the PA method can be modified by providing for means and variances of the language model weights to be updated by small amounts, e.g., as measured in terms of the Kullback-Leibler (KL)-divergence between the corresponding Gaussian weight distributions, but enough so that a previously misclassified instance becomes correctly classified with sufficient probability. Because KL-divergence increases more rapidly when the vector of weight means is updated in a direction of low variance than in a direction of high variance, updates tend to be larger on less confident features.

The exemplary method extends the PA algorithm by introducing a confidence measure $\lambda_i$ indicating how confident the algorithm is in the current estimate $w_i$ for a weight of n-gram feature i. In the exemplary embodiment, the confidence measures $\lambda_i$ compose a diagonal matrix $\Lambda$ having one value $\lambda_i$ per weight $w_i$ per n-gram feature i. The result of this extension is that instead of equally changing all feature weights upon encountering improperly weighted features, the method changes more aggressively (in either the positive or negative direction) the weights in which it is less confident. Additionally, for soft-margin cases where training data labels are noisy (i.e., some translations are incorrectly classified as fluent or non-fluent translations), a parameter C may be introduced to compensate for noisiness of the training data, as discussed below.

Pseudocode for an exemplary confidence-weighted extended PA algorithm is represented by Algorithm 1 below, which is described in more detail below. As will be appreciated, steps of the algorithm can be modified slightly, without departing from the exemplary method. The method and a system for performing the method are described in greater detail with respect to FIGS. 2-5.

| Algorithm 1: Confidence-weighted Passive-Aggressive Algorithm | |
| --- | --- |
| 1. | Input: Tr = $\{(P_i, N_i), 1 \leq i \leq K\}$ |
| 2. | $w_0 = 0, t = 0$ |
| 3. | for a predefined number of iterations do |
| 4. | for i in $1 \leq i \leq K$ do |
| 5. | for all $(p_j, n_j) \in (P_i \times N_i)$ do |
| 6. | $\Delta = \phi(p_j) - \phi(n_j)$ |
| 7. | if $w_t^T \Delta \leq 0$ then |
| 8. | $\tau = \dfrac{1 - w_t^T \Delta}{\|\Lambda^{-1}\Delta\|^2}$ |
| 9. | $w_{t+1} = w_t + \tau \Lambda^{-2} \Delta$ |
| 10. | update $\Lambda$ |
| 11. | $t = t + 1$ |
| 12. | return $w_t$ | where Tr represents a training data set comprising sets $P_i$ and $N_i$ of fluent (more positively ranked, by a first ranking) and non-fluent (more negatively ranked by the first ranking) translations of the same source string $s_i$, and K is the number of source strings. $p_j, n_j$ represents a pair of translation strings taken from the set $P_i$ and $N_i$. $\Delta$ represents a difference vector which is computed as a difference between a first vector $\phi(p_j)$, which represents the counts of all the n-gram factored features in the positive target string $p_j$ (where factored features not found can have a zero count), and a second vector $\phi(n_j)$, which represents the counts of all the n-gram factored features in the negative target string $n_j$. $w_t$ represents a current set of weights (at time t), one weight for each of the factored features in the set. T represents the transpose operator. $w_{t+1}$ represents an updated weight, at time t+1, which becomes $w_t$ for the next iteration. $w_{t+1}$ is generated by updating the weight $W_t$. Briefly, as shown on line 9 of algorithm 1, the weights are updated as a function of confidence measures $\lambda_i$ on the weights, these being in the form of a matrix $\Lambda$. $\tau$ represents a learning rate. The expression $w_t^T \Delta$ is referred to herein as a second relative ranking for the pair of strings $p_j, n_j$. As will be appreciated, a different threshold may be used in place of 0 in the expression $w_t^T \Delta \leq 0$. For example, the threshold could be −0.1, or the like.

Here, "vector" and "matrix" refer broadly to any data structure capable of representing each of the elements in it.

Figure 2:
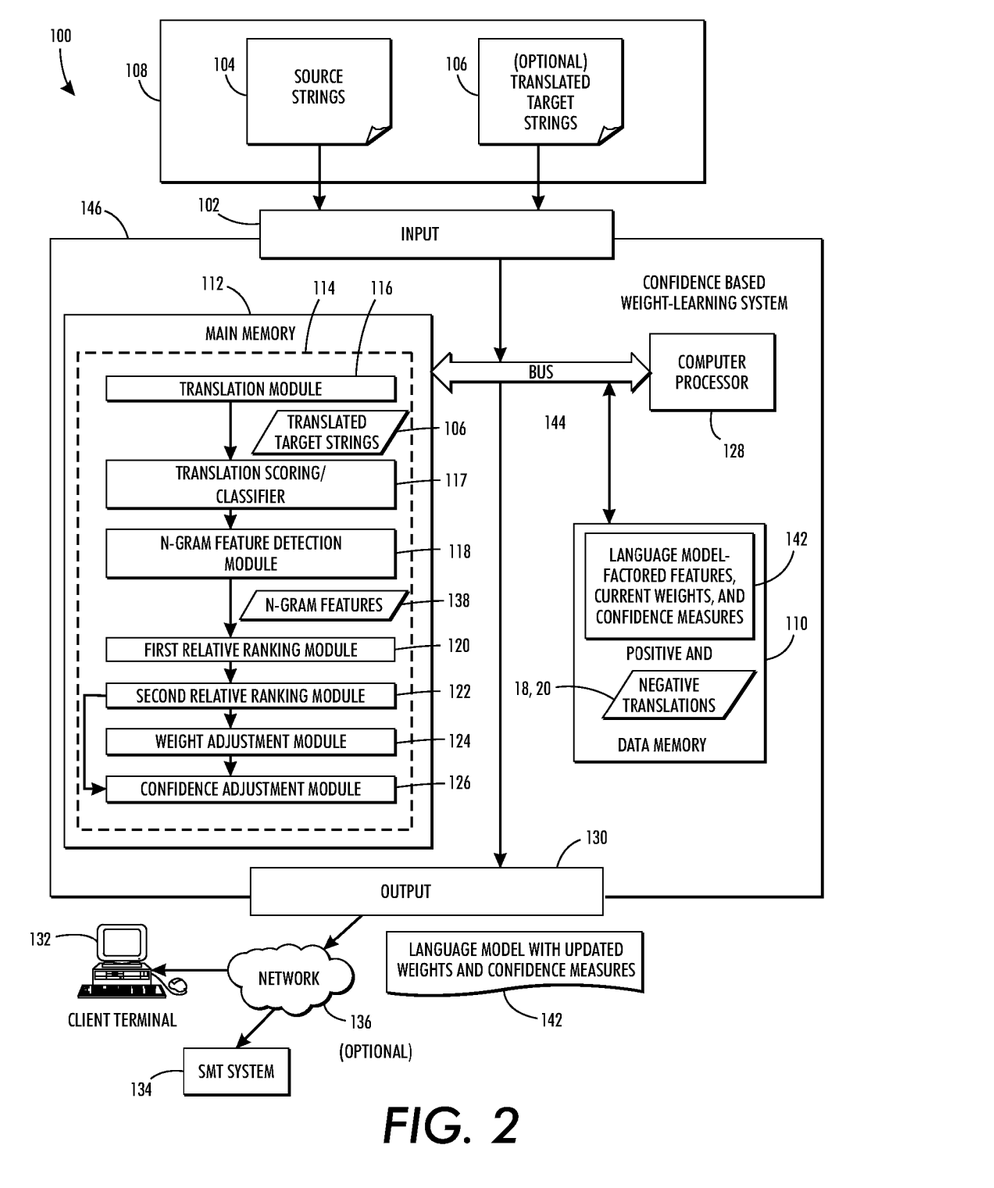
FIG. 2 illustrates a system for building a language model for a translation system.

With reference to FIG. 2, an exemplary rendering system 100 for confidence-weighted learning of a factored discriminative language model is illustrated. The system 100 is a non-transitory device which includes an input device 102 for receiving at least one source string 104 in a first (source) natural language, and optionally, a set of at least two translations 106 of the at least one source string 104 in a second (target) natural language. In the alternative, string inputs 104, 106 may be produced by and/or stored in the system 100 itself. The source and target strings 104, 106 may be entire sentences, paragraphs, or any other combination of words or sub-strings. The source and target strings 104, 106 may be embodied in one or more documents or by any other grouping of data such as in a database. Alternatively, the source and target strings 104, 106 may be input into the system 100 separately. Prior to inputting, string inputs 104, 106 may be stored in any suitable tangible storage medium 108, such as a disk, ROM or RAM, or may be input into the system 100 in the form of a carrier wave, e.g., via the Internet. The input device 102 may include a modem link, a wired or wireless connection, USB port, floppy or hard disk receiver, transceiver portion of a cellular telephone, or the like and may be separated or combined with other components of the system 100.

The system 100 includes data memory 110 for storing the source strings 104, target strings 106 and any other input or intermediate data during processing. Main memory 112 of the system 100 stores instructions 114 for performing the exemplary method, including a translation module 116, a translation scoring and classifying module 117, an n-gram feature detection module 118, first relative ranking module 120, second relative ranking module 122, weight adjustment module 124, and a confidence adjustment module 126. It is to be appreciated that memories 110, 112 may be embodied as a single memory unit, or that one or both of memories 110, 112 may comprise two or more component memory units. The instructions 114 are suitably executed by a digital processor such as computer processor 128. The digital processor 128 can be variously embodied, such as by a single core processor, a dual core processor (or more generally by a multiple core processor), a digital processor and cooperating math coprocessor, a digital controller, or the like. Outputs from modules 116, 118, 120, 122, 124, 126 may be stored in memories 110, 112 and/or output via an output device 130 to a client terminal 132 or other device such as an external computer having memory and a processor, which stores a statistical machine translation system 134, optionally through a network 136 such as the Internet. In one illustrative example, the system 100 is located on a server that is part of a distributed or cloud computing network. In such a case, inputs 104, 106 may be input to the system 100 remotely via input 102. Input 102 and output 130 modules may be suitably networked to a portal of the server. Processor 128 and memories 110, 112 may be suitably embodied by a digital processor (e.g., microprocessor or parallel array of microprocessors) and memory component(s) of the server.

The translation module 116 (such as a statistical machine translation system) receives as input the one or more source strings 104 and generates a set of translated target strings 106 corresponding to the source strings 104. Any suitable method for translating a source string 104 into a target string 106 may be employed by the translation module 116 (see, for example, the patent references listed above). In embodiments where translated target strings 106 are input into the system 100, the translation module 116 may be omitted. A language model 142 is stored in memory 110 and includes current weights for each of a large set of n-gram factored features 10 which have been identified in a corpus of sentences in the target language, as well as current weights and confidence measures for each of the n-gram features.

The translation scoring and classifying module 117 scores the translations for fluency based on a translation scoring metric, such as the BLEU or NIST score, and, based on the scores, identifies a set of positive translations (p), e.g., those with the best scores on the scoring metric, and a set of negative translations (n), e.g., those with the worst scores, or, at least, with scores lower than the translations in the positive set.

The n-gram feature detection module 118 receives as input the set of translated target strings 106 from the translation module 116 (or from memory 110, 112 if previously input into the system 100), which have been selected as positive or negative sentences by classifier 117. The n-gram feature detection module 118 segments each target string 106 into n-grams (FIG. 1, 10) and, for each n-gram 10 determines a set of factored features. For example, with respect to FIG. 1, sets 14 and 16 contain bi-gram factored features for each target translation 18, 20 that include a) two surface forms, b) a surface form and POS, c) a POS and a surface form, by way of a simplified example. As described above, the factored features may include any combination of surface forms, lemmas, POS, extended POS, etc. Any suitable method for determining factor features of an n-gram may be employed by the n-gram feature detection module 118. For instance, a POS tagger may be used. The target sentence is treated as a sequence of tokens (words, punctuation, etc.) and for each word, the most likely part of speech is assigned by the POS-tagger, which is then applied to the respective n-gram factored feature(s) 10. In the exemplary embodiment, the n-grams are tri-grams, but any other n-gram size or combination of n-gram sizes (such as bi-grams and tri-grams together) are contemplated.

The first relative ranking module 120 receives as input pairs of positive and negative translations 18, 20 one translation of each pair being drawn from the positive set p and the other from the negative set n identified from the set of two or more translated target strings 106. For at least one pair of target strings from the set of translated target strings 106, the first relative ranking module 120 determines a relative ranking between each target string 106 in the pair based on their assigned fluency scores output by the classifier 117. In other embodiments, target strings may be drawn at random from the pool of translation strings and, for each pair of target strings 106, the target string with the higher BLEU measure is determined to be a positive translation 18 and the target string with the lower BLEU measure is determined to be a negative translation 20 for the source sentence 22. In yet another embodiment, multiple target strings 106 are ranked, and the target strings with a measure above a certain threshold are identified as positive translations 18, and the remaining target strings are identified as negative translations 20.

The second relative ranking module 122 receives as input pairs of translations, each pair including a positive target translations 18 and a negative target translation 20 for one or more source strings 22. The target translations 18, may be generated by the first relative ranking module 120, or may be input into the system 100 independent of the first relative ranking module 120. The second relative ranking module 122 determines a second relative ranking between each pair of translations comprising a positive translation 18 and negative translation 20. Specifically, for each pair of translations consisting of a positive 18 and negative translation 20, the second relative ranking module 122 determines a ranking of the positive translation 18 relative to the negative translation 20 based at least in part on the weights 30 for each n-gram factored feature 10 and at least one count 32 of the number of times each n-gram factored feature 10 occurs in the positive and negative translations 18, 20. The resulting second relative ranking is a metric for determining whether the current weights 30 of the n-gram features found in the two translations 18, 20 should be updated in the language model in order to bring the second ranking in closer agreement with the previously determined first relative ranking. The process performed by the second relative ranking module 122 corresponds to lines 6-7 of Algorithm 1, and is explained in more detail with respect to the method of FIGS. 3 and 4.

If the second relative ranking is not in agreement with the first relative ranking, for example, the negative translation in the pair is ranked more highly than the positive translation, it can be assumed that one or more of the current weights 30 of the n-gram factored features 10 of the positive and negative translations 18, may need adjustment. In this case, weight adjustment module 124 adjusts the weights 30 for each n-gram factored feature 10, but not equally. Rather, the weights are adjusted as a function of the respective weight's current confidence measure. For example, each weight is adjusted by an amount determined based on the at least one count 32 determined by the second relative ranking module 122, the previous weight of the n-gram factored feature 10, and the confidence measure for the n-gram factored feature 10. The process performed by the weight adjustment module 124 corresponds approximately to lines 8 and 9 of Algorithm 1, and is explained in more detail with respect to FIGS. 3 and 4.

The confidence adjustment module 126 adjusts the confidence measure for each n-gram factored feature 10 as a function of previous observations of the n-gram factored feature, e.g., based at least in part on the number of times the n-gram factored feature 10 has been encountered (e.g., considered in a computation in prior iterations) by the system 100. The process performed by the confidence adjustment module 126 corresponds approximately to line 10 of Algorithm 1, and is explained in more detail with respect to FIG. 3. After the confidence measures are updated, the system 100 may output an updated language model 142 with the updated weights and confidence measures via output device 130.

In the exemplary embodiment, components 114, 116, 117, 118, 120, 122, 124, 126 comprise software instructions stored in main memory 112, which are executed by the computer processor 128. The processor 128, such as the computer's CPU, may also control the overall operation of the computer system 100 by execution of processing instructions stored in memory 112. Components 102, 110, 112, 114, 116, 117, 118, 120, 122, 124, 126, 128 may be connected by a data control bus 144.

As will be appreciated, system 100 may include fewer or more components while still having the same functionality. For example, components 116, 117, 118, 120, 122, 124, 126, 128 may be combined to form fewer components, or may be functionally separated to form more individual components.

The language model confidence-based weight-learning system 100 may comprise one or more computing devices 146, such as a personal computer, PDA, laptop computer, server computer, or combination thereof. In some embodiments, the system 100 may be incorporated into an SMT system 134. In other embodiments, the SMT system may comprise the translation module 116 that is resident on computer 146. Memories 110, 112 may be integral or separate and may represent any type of computer readable medium such as random access memory (RAM), read only memory (ROM), magnetic disk or tape, optical disk, flash memory, or holographic memory. In one embodiment, the memories 110, 112 comprise a combination of random access memory and read only memory. In some embodiments, the processor 128 and memory 110 and/or 112 may be combined in a single chip.

The system 100 may output a portion or all of a language model 142 comprising n-gram factored features, weights, and corresponding confidence measures to an external output device, such as a client terminal 132 or SMT system 134, or the like. The output device 130 may be connected directly with the system 100 or linked thereto, e.g., via a wired or wireless link 136, such as a local area network, wide area network, or the Internet.

The term "software" as used herein is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Figure 3:
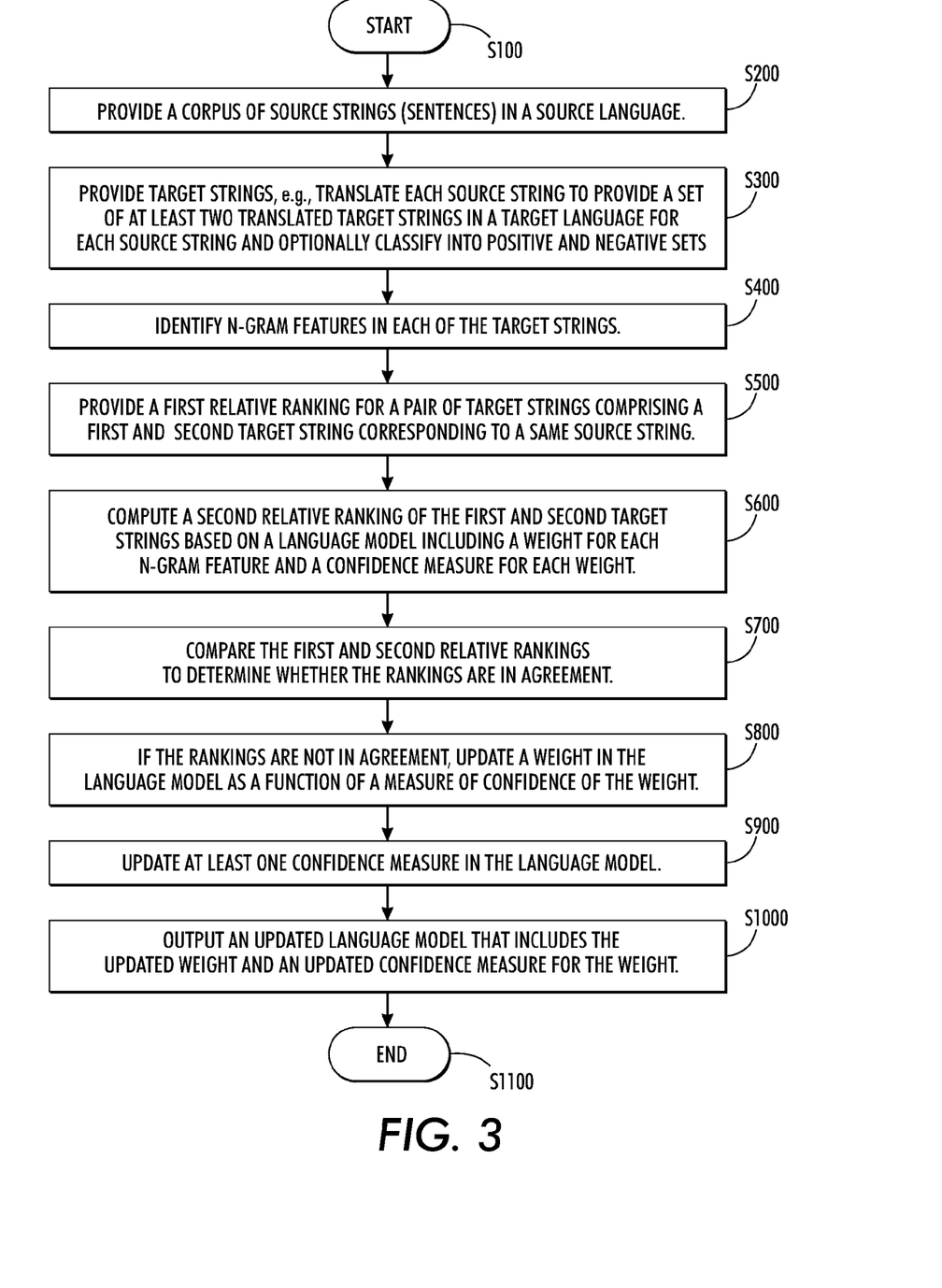
FIG. 3 is a flow chart illustrating a method for building a language model that may be performed on the system illustrated by FIG. 2.

FIG. 3 illustrates an exemplary method for learning language models using weights and confidences in conjunction with factored features. The method may be performed with the exemplary system 100 described with reference to FIG. 2. The method begins at S100.

At S200, the translation module 116 receives source strings 104 into computer memory 110. With reference to FIG. 1, sentence 22 is an example source string 104 that may be input into the system 100.

At S300, a set of translation strings 106 is provided for the input source string 104. In one embodiment, the translated target strings 106 corresponding to source strings 104 are input into computer memory 110 from an external source. In other embodiments, the translation module 116 translates the source strings 104 into a target language and generates a set of translated target strings 106, such as sentences. With reference also to FIG. 1, sentences 18 and 20 are examples of translated target strings 106 corresponding to a source string 104.

At S400, a set of n-gram factored features (FIG. 1, 10) for each string in the set of translated target strings 106 is computed, e.g., by the n-gram feature detection module 118. With reference to FIG. 1, the bi-gram sets 14, 16 illustrate a subset of the n-gram factored features 10 of target strings 18, 20.

At S500, a first relative ranking for a pair of the target strings is generated. For example, the first relative ranking module 120 receives as input the pairs of translated target strings 106 and outputs a relative ranking based on the BLEU machine translation evaluation metric, as described above. The target string with the higher BLEU measure is considered a positive translation 18 and the target string with the lower BLEU measure is considered as a negative translation 20 for the source sentence 22 for the following step. The pairs of positive and negative translations 18, 20 are used as training data for the rest of the method. In alternate embodiments, the sets of positive and negative translations may be input into the system such that the method may proceed to S600 directly. The output of the first relative ranking module 120 corresponds approximately to line 1 of Algorithm 1.

At S600, a second relative ranking $w_t^T \Delta$ is computed for the pair of target sentences. For example, the second relative ranking module 122 (or any other component of the system 100) initializes a vector of weights w and an iteration counter t to 0. The vector w contains a single weight for each n-gram factored feature in the current language model 142. When initialized, the weights may all be set to the same value, or any other initial value, which are progressively refined through several iterations with new target sentence pairs. The counter t increases each time that the weight vector w is potentially updated. FIG. 1 illustrates an example weight vector $w_t$ containing weight values 30. For ease of illustration the weights are only shown for those n-gram factored features present in translations 18, 20. In practice, the weight vector may include hundreds of thousands or even millions of elements 30, one for each factored feature in the language model 142.

Figure 4:
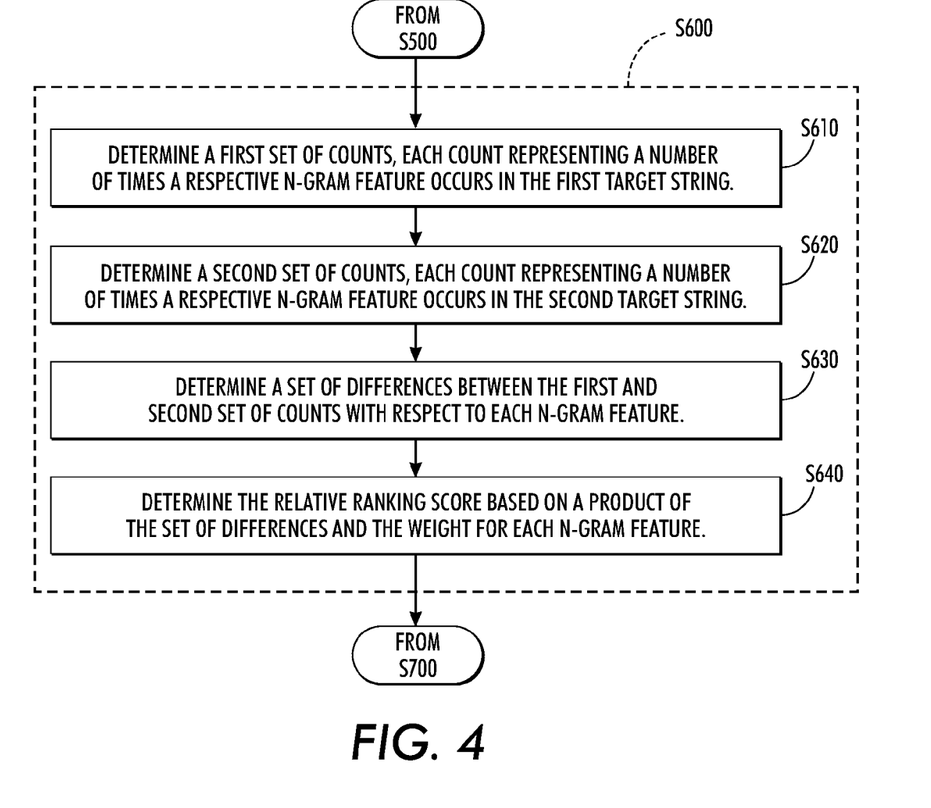
FIG. 4 is a flow chart illustrating certain aspects of computing a second relative ranking with respect to the method of FIG. 3.

FIG. 4 illustrates S600 in more detail At S610 and S620 first and second set of counts (represented as vectors $\phi(p_i)$ and $\phi(n_i)$, respectively), are computed, e.g., by the second ranking module 122, with each set of counts representing a number of times that a respective n-gram factored feature occurs in corresponding target strings. FIG. 1 illustrates example vectors $\phi(p_i)$ and $\phi(n_i)$ corresponding to target strings $p_i$ 18 and $n_i$ 20. To perform this operation, the ranking module 122 considers a vector $\phi$ that contains one entry for each possible n-gram factored feature 10 in the language model. The value at each n-gram entry in $\phi$ corresponds to a count 32 of the number of times that the corresponding n-gram factored feature 10 occurs in a given target string 18, 20. In the exemplary embodiment, $\phi$ is implemented as a vector with one entry for each n-gram factored feature 10 encountered during operation of the method. N-gram factored features without an entry in $\phi$ are considered to have a value of 0 (since the n-gram has not been encountered during operation of the method). The vector can be stored in a simplified form by only reserving space in the vector for encountered n-grams, which serves to lower memory requirements. The $\phi$ vector for a given string x is noted as $\phi(x)$ and includes counts for all of the n-gram factored features 10 for string x. The values 32 for each n-gram factored feature 10 is the count of the number of times that the particular n-gram factored feature 10 occurs in the string x. For example, FIG. 1 illustrates the general vector $\phi$, representing all possible n-gram factored features as well as $\phi(p_i)$ and $\phi(n_i)$ for positive translation $p_i$ 18 and negative translation $n_i$ 20. Each n-gram factored feature 10 in the $\phi(p_i)$, and $\phi(n_i)$ vectors contains a count 32 corresponding to the number of times the n-gram factored feature 10 occurs in $p_i$ or $n_i$, respectively.

At S630, after determining the $\phi(p_i)$, and $\phi(n_i)$ vectors for each pair of positive and negative translations 18, 20 a difference vector $\Delta$ equal to $\phi(p_i)$ minus $\phi(n_i)$ is computed, e.g., by the second relative ranking module 122. This process corresponds to line 6 of Algorithm 1. That is, for each like n-gram factored feature 10 in $\phi(p_i)$, and $\phi(n_i)$, the difference 34 between the value 32 of the n-gram factored feature in $\phi(n_i)$ is subtracted from the value 32 of the n-gram factored feature in $\phi(p_i)$. FIG. 1 illustrates a difference vector $\Delta$ containing differences values 34 for $\phi(p_i) - \phi(n_i)$. The n-gram factored feature "sat down" has a difference 34 of 1 since it occurs one time in $p_i$ but not in $n_i$, and "sat downward" has a difference 34 of $-1$ since it occurs one time in $n_i$ but not in $p_i$. The values 34 in the difference vector $\Delta$ are an indication of which n-grams occur more often in positive translations as opposed to negative translations, and vice versa. The $\Delta$ vector is ultimately computed for each pair of positive and negative translations 18, 20 by virtue of the iterative nature of the method.

At S640, after determining the difference vector $\Delta$ for a pair of positive and negative translations 18, 20, $w_t^T \Delta$, is computed, e.g., by the second ranking module 122. $w_t^T \Delta$ is the inner product of the weight vector $w_t$ and the difference vector $\Delta$. This is (line 7 of Algorithm 1). The result of the computation indicates whether the weight vector is in agreement with the counts of the n-grams 10 in the respective positive and negative translations 18, 20. It is desirable to have a weight vector $w_t$ with a positive $w_t^T \Delta$ since this is an indicator that the weight vector $w_t$ is in conformity with the difference vector $\Delta$. In geometric terms, a positive $w_t^T \Delta$ means that the weight vector $w_t$ identifies a good direction and a good model that is helpful in determining whether an n-gram factored feature is a good indicator of fluency of a translated string.

Accordingly, at S700, a determination of whether the second relative ranking is in agreement with the first relative ranking of target strings 18, 20 is made. This may be performed by ascertaining whether the computed $w_t^T \Delta$ is less than or equal to zero, e.g., by the second relative ranking module 122.

Figure 5:
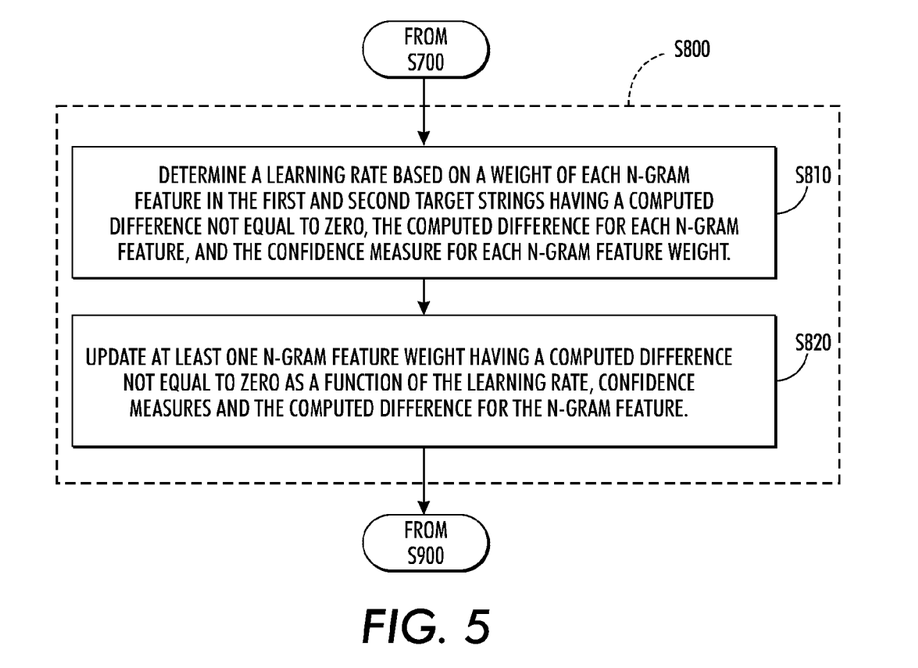
FIG. 5 is a flow chart illustrating certain aspects of updating weights in the language model with respect to the method of FIG. 3.

At S800, the values 30 of the weight vector $w_t$ may be adjusted, e.g., by the adjustment module 124, if the second relative ranking is not in agreement with the first relative ranking. The weight values 30 are adjusted by an amount determined at least in part by the confidence measure $\lambda_i$ for each weight $w_i$ in $w_t$. The operation performed at S800 corresponds approximately to lines 8 and 9 of Algorithm 1. FIG. 5 illustrates the operation of S800 in more detail.

At S810, a learning rate $\tau$ is determined based on the second relative ranking $w_t^T \Delta$ and the confidence measure $\lambda_i$ for each weight $w_i$ in $w_t$, e.g., by the weight adjustment module 124. For example, at iteration t of the method, the weight vector $w_t$ is updated (by the weight adjustment module 124), by solving the optimization in equation (3) below, where it is the diagonal matrix with confidence measures on its diagonal corresponding to each weight $w_i$ in $w_t$.

$$w_{t+1} = \arg\min_w \tfrac{1}{2} \|\Lambda(w - w_t)\|^2 \tag{3}$$

$$\text{subject to } w^T \Delta \geq 1 \tag{4}$$

where $\Delta = \phi(p_j) - \phi(n_j)$, as noted above and w is the vector upon which the minimization is performed.

The update method has two advantages. First, the weights are updated aggressively enough to rank the current pair of target strings 18, 20 correctly (i.e., by satisfying the constraint of (4)). Second, the method preserves, as much knowledge learned so far as possible (i.e., by minimizing the change to $w_t$). The special case where $\Lambda = 1$ is a typical Passive-Aggressive algorithm and may be used here. A can thus be a diagonal matrix of confidence measures corresponding to each n-gram factored feature weight in weight vector $w_t$. By introducing multiple confidence measures via the diagonal matrix $\Lambda$, the method (by way of the weight adjustment module 124) ensures that feature weights having a higher confidence measure $\lambda_i$ (learned from prior training instances) contribute more to the accumulated knowledge than feature weights with a lower confidence measure $\lambda_i$. The method therefore assumes that a change in weights having a higher confidence measure is more risky than a change with the same magnitude on a weight with a lower confidence measure. Accordingly, in order to avoid over-fitting the weight adjustment amount to the current instance pair of target strings 18, 20, the difference between w and $w_t$ is weighted by confidence matrix $\Lambda$ in the objective function.

To solve the quadratic optimization problem in (3), a corresponding Lagrangian function can be formed:

$$L(w,\tau)=\tfrac{1}{2}\|\Lambda(w-w_t)\|^2+\tau(1-w^T\Delta) \quad (5)$$

where $\tau$ is a Lagrange multiplier. Setting partial derivatives to zero with respect to w gives:

$$\nabla_w L=\Lambda^2(w-w_t)-T\Delta=0 \quad (6)$$

so $$w=w_t+\tau\Lambda^{-2}\Delta \quad (7)$$

Inserting (7) back into the Lagrangian function (5), setting partial derivatives with respect to $\tau$ to zero, and solving for $\tau$ yields:

$$\tau = \frac{1-w_t^T\Delta}{\|\Lambda^{-1}\Delta\|^2} \quad (8)$$

where $\tau$ is a scalar learning rate used in determining an amount to adjust one or more weights in weight vector $w_t$, and $\Delta$, $w_t^T\Delta$, and $\Lambda$ are as noted above.

In other words, (8) is used to calculate learning rate T which is in turn employed (e.g., by the weight adjustment module 124) to calculate an amount to adjust one or more weights in weight vector $w_t$. This process corresponds approximately to line 8 of Algorithm 1.

At S820, at least one n-gram factored feature weight (FIG. 1, weight value 30) in the weight vector $w_t$ is adjusted as a function of the learning rate $\tau$, the confidence measures $\Lambda$ and the difference vector $\Delta$ (e.g, by the weight adjustment module 124). The function for updating the weight vector $w_t$ may be represented by:

$$w_{t+1}=w_t+\tau\Lambda^{-2}\Delta \quad (9)$$

where $\Lambda^{-2}$ is the inverse square of the confidence measures in the diagonal matrix $\Lambda$, and
$\tau\Lambda^{-2}\Delta$ is a vector determined from the product of $\tau$, $\Lambda^{-2}$, and $\Delta$.

At 5900, the confidence matrix $\Lambda$ is updated (e.g., by the confidence adjustment module 126). The updates can be based on an assumption that the more often the method has encountered an n-gram factored feature, the more confident it is in the feature weight estimation. In the exemplary embodiment, for weight $w_i$ in weight vector $w_t$, $\lambda_i$ of confidence matrix $\Lambda$ is set to the logarithm of the number of times the algorithm has seen n-gram factored feature i. In alternate embodiments, other functions for updating the confidence measures may be employed.

At S1000, after multiple iterations of the method, an updated language model 142 is output by the system 100 that includes the n-gram factored features 10, updated weight vector $w_t$ containing a weight $w_i$ for each n-gram factored feature 10, and a confidence matrix $\Lambda$ containing updated confidence measures $\lambda_i$ for each weight $w_i$.

The method ends at S1100.

A translation system 134 employing the exemplary language model 142 may receive an input source string, such as a sentence to be translated and score possible translations of the source string with a scoring function which uses, as one of its elements the language model 142. In addition to using the language model within an SMT 134 to generate and/or validate string translations, the output language model may be employed in other ways. Among other things, the language model 142 output by the exemplary method and system 100 may be used in a re-ranking step when acting on an n-best list of translation candidates. For example, the SMT 134 may use the language model to rank a set of translations generated by the SMT 134. In this embodiment, relative rankings $w_t^T\Delta$, may be computed, as described above, for sentence pairs, and the most highly ranked sentence is output.

Alternatively, the output language model may be used as a new feature in a re-scoring step, where the language model is used to alter the measures on the edges of a translation lattice, thus implicitly re-ranking all translations encoded in the lattice.

The method illustrated in FIGS. 3-5 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Extension to Soft Margin

In many practical situations, the training labels are noisy. This is particularly true for discriminative language modeling, where even human experts may disagree as to whether a given sentence is fluent or not. An indirect and relatively inexpensive way to generate the labels is to rank translations in n-best lists by NIST or BLEU measures, then take the top ones as fluent instances and bottom ones as non-fluent instances. However, neither NIST nor BLEU are designed directly for measuring fluency. For example, a translation could have low NIST and BLEU measures if it does not convey the same information as a reference, despite being perfectly fluent. Therefore, in language modeling it is desirable to have a weight learning method that is robust to noise in the training data.

The update rule given by (8) always forces the new weights to satisfy the constraint of (3) and (4). Consequently, a mislabeled training instance could make the algorithm significantly change feature weights in an erratic manner. To increase robustness to noise, a soft margin variant of confidence-weighted learning is proposed. The optimization problem thus becomes:

$$w_{t+1}=\arg\min_w \tfrac{1}{2}\|\Lambda(w-w_t)\|^2+C\xi^2 \quad (9)$$

subject to $w^T\Delta\geq 1-\xi$ (10)

where C is a positive parameter controlling a relative importance between the two terms in the objective function, and $\xi$ is a slack variable measuring the amount of disagreement between the rankings for any given weight vector. If the training set is highly noisy, parameter C can be set to a small value, and vice versa.

The corresponding Lagrangian can be expressed as:

$$L(w,\xi,\tau) = \tfrac{1}{2}\|\Lambda(w-w_t)\|^2 + C\xi^2 + \tau(1-\xi-w^T\Delta) \quad (11)$$

Similar to the hard-margin case, setting $\nabla_w L=0$ and solving for w yields:

$$w = w_t + \tau\Lambda^{-2}\Delta \quad (12)$$

Setting the Lagrangian partial derivative with respect to $\xi$ to zero and solving for $\xi$ gives:

$$\xi = \frac{\tau}{2C} \quad (13)$$

Replacing w and $\xi$ into the Lagrangian, setting partial derivatives with respect to $\tau$ to zero and solving for $\tau$ yields:

$$\tau = \frac{1-w_t^T\Delta}{\|\Lambda^{-1}\Delta\|^2 + \dfrac{1}{2C}} \quad (14)$$

The training method of Algorithm 1 may be adapted for soft-margin cases by replacing (8) with (14) when updating $\tau$.

Without intending to limit the scope of the exemplary embodiments, the following examples illustrate aspects of an exemplary prototype system and method.

EXAMPLES

The exemplary method and system 100 have been empirically validated. In a first experiment, the effectiveness of the method was measured by deciding, given a pair of candidate translations for a same source sentence, whether the first candidate is more fluent than the second, or vice-versa. In a second experiment, the discriminative language model (DLM) 142 provided by the exemplary method was compared against alternative algorithms in terms of impact on NIST and BLEU scores.

Evaluation Dataset

A large training set was used in the experiments. The training set includes a parallel corpus between Spanish and English, and contains 1,240,774 sentence pairs (after applying some basic filtering to rule out trivial instances). Additionally, a development set and test set each containing around 1,000 sentence pairs was used.

The training set and development set were used to train an SMT system 134. The data for training the DLM was obtained by taking a random subset of the parallel training set of the SMT system containing 50,000 sentence pairs. The SMT then generated an n-best list for each source sentence. The pairs of positive and negative translated sentences $(P_i, N_i)$, $i=1, \ldots, 50000$ may be defined as:

$$P_i = \{s \in \text{nbest}_i | \text{NIST}(s) \geq \text{NIST}(p\text{Ref}_i)-1\} \quad (15)$$

$$N_i = \{s \in \text{nbest}_i | \text{NIST}(s) \geq \text{NIST}(p\text{Ref}_i)-3\} \quad (16)$$

where $p\text{Ref}_i$ denotes (one of) the candidate translation(s) in the i-th n-best list with highest sentence-level NIST measure (a pseudo-reference). The size of each n-best list was set to 10. Using this dataset, DLMs were trained by standard perceptron, confidence-weighted learning and confidence-weighted learning with soft margin methods.

The scores produced by the DLMs were used to train a re-ranker using eight features (seven from the baseline SMT plus one from the DLM) using a simple structured perceptron algorithm on the development set. Alternatively, a standard algorithm used for parameter training in the SMT system could have been used instead.

For testing, the SMT was used to generate n-best lists of size 1,000 each for each source sentence. Then, each trained DLM was used to compute a measure for each translation in the n-best list. The measure is used with seven standard SMT features for re-ranking. Finally, the quality of the re-ranked n-best list was measured.

Results

In the first experiment, the quality of the re-ranked n-best lists was measured according to a classification error rate. The error rate was computed as the fraction of pairs from a test-set which are ranked correctly according to its fluency measure (approximated here by the BLEU measure). The results of these measurements are provided in Table 2 below, where a lower error rate is better. The baseline model refers to a generic SMT system with a generative language model. DLM1 refers to a re-ranker including a discriminative language model trained using a perceptron algorithm. DLM2 is the same as DLM1, except that the DLM is trained using confidence-weighted passive-aggressive updates, as described in Algorithm 1. DLM3 is the same as DLM2, but uses the soft-margin extension given by (14).

TABLE 2

Error rates for fluency ranking

|  | Error rate |
|---|---|
| Baseline Model | 0.4720 |
| Baseline + DLM1 | 0.4183 |
| Baseline + DLM2 | 0.4005 |
| Baseline + DLM3 | 0.3803 |

All of the discriminative language models strongly reduced the error rate compared to the baseline (11.4%, 15.1%, 19.4% relative reduction, respectively). it should be noted that the training set for these discriminative language models is a relatively small subset of the one used to train the SMT's integrated generative language model. Amongst the three discriminative learning algorithms, it is shown that the confidence-weighted learning DLM2 is slightly better than perceptron, and confidence-weighted learning with soft margin DLM3 is the best (9.08% and 5.04% better than perceptron and confidence-weighted learning with hard margin).

In a second experiment, standard NIST and BLEU measures were used for evaluation of the results of the trained systems. The results of the second experiment are shown in Table 3, where a higher score is better.

TABLE 3

NIST and BLEU measures upon n-best list re-ranking with the proposed discriminative language models

|  | NIST | BLEU |
|---|---|---|
| Baseline model | 6.9683 | 0.2704 |
| Baseline + DLM1 | 6.9857 | 0.2709 |
| Baseline + DLM2 | 7.0288 | 0.2745 |
| Baseline + DLM3 | 7.0815 | 0.2770 |

The relative quality of the different methods in terms of NIST and BLEU correlates well with error rate. All of the three discriminative language models improved performance as compared to the baseline model.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for building a language model for a translation system, comprising:
   providing a language model which includes a weight for each of a set of n-gram factored features which have been identified in a corpus of sentences in a target language;
   providing a set of machine translations in the target language of a same source string in a source language;
   providing a first relative ranking of first and second of the machine translations, based on a computed translation scoring metric;
   computing counts of n-gram factored features for the first and second machine translations;
   determining a second relative ranking of the first and second translations using the weights of the language model for the n-gram factored features of the first and second machine translations and the computed counts;
   comparing the first and second relative rankings to determine whether they are in agreement; and
   where, based on the comparison, the rankings are not in agreement, updating one or more of the weights in the language model as a function of a measure of confidence in the weight, the measure of confidence being a function of previous observations of the n-gram factored feature in the method.

2. The method of claim 1, wherein the adjusting of the weight is performed using a computer.

3. The method of claim 1, wherein the updated language model is used to create or validate a translation in a target language of a source language string.

4. The method of claim 1, wherein the updated language model is used to alter the edges of a translation lattice.

5. The method of claim 1, wherein the n-gram features each comprise at least one of:
   a surface form feature,
   a part of speech feature, and
   a combination thereof.

6. The method of claim 1, wherein the language model comprises a confidence measure for each weight in the set of weights.

7. The method of claim 6, wherein the confidence measures for the set of n-gram features identified in a corpus of translations are embodied in a diagonal matrix.

8. The method of claim 1, wherein the source string comprises an entire sentence.

9. The method of claim 1, wherein the weight of each n-gram feature in the language model is proportional to the likelihood that an occurrence of the n-gram feature in a translation of a source string indicates that the translation would be ranked positively by the first ranking.

10. The method of claim 1, wherein the providing of the first relative ranking includes determining the first relative ranking of the first and second translations based on a translation scoring metric.

11. The method of claim 1, wherein the determining the second ranking comprises:
   determining a first set of counts, each count representing a number of times a respective n-gram feature occurs in the first translation;
   determining a second set of counts, each count representing a number of times the respective n-gram feature occurs in the second translation;
   computing a set of differences between the counts in the first and second sets of counts; and
   computing a function of the set of weights and the set of differences.

12. The method of claim 1, further comprising providing a set of translations of the source string and performing method for pairs of translations.

13. The method of claim 1, wherein the determination of whether the first and second rankings are in agreement is performed for every combination of a first translation selected from a set of positive translations and a second translation selected from a set of negative translations of the source string, the positive translations each having a first relative ranking with respect to each of the negative translations.

14. The method of claim 1, further comprising repeating the method for each source string in a set of source stings strings.

15. The method of claim 1, wherein the confidence measure for an n-gram feature weight is a function of a number of times the method has observed the n-gram feature.

16. The method of claim 1, wherein the confidence measure for an n-gram feature weight is derived from a logarithm of the number of times the method has observed the n-gram in previous translation pairs.

17. The method of claim 1, further comprising providing a translation system comprising the language model, the translation system providing a ranking measure for a new translation based on a set of n-gram features for the new translation and the language model's weights for the set of n-gram features.

18. A computer program product comprising a non-transitory medium, encoding instructions, which when executed by a computer, perform the method of claim 1.

19. A method, for building a language model for a translation system, comprising:
   providing a first relative ranking of first and second translations in a target language of a same source string in a source language;
   determining a second relative ranking of the first and second translations using weights of a language model, the language model including a weight for each of a set of n-gram features, the determining of the second ranking comprising:
     determining a first set of counts, each count representing a number of times a respective n-gram feature occurs in the first translation;
     determining a second set of counts, each count representing a number of times the respective n-gram feature occurs in the second translation;
     computing a set of differences between the counts in the first and second sets of counts; and
     computing a function of the set of weights and the set of differences;
   comparing the first and second relative rankings to determine whether they are in agreement; and
   where, based on the comparison, the rankings are not in agreement, updating one or more of the n-gram feature weights in the language model as a function of a measure of confidence in the weight, the measure of confidence being a function of previous observations of the n-gram feature in the method, comprising:

determining a learning rate based on a current weight of each n-gram feature identified in the first and second translations having a non-zero computed difference, the computed difference for each n-gram feature, and the confidence measure for each n-gram feature weight; and updating the n-gram feature weight as a function of the learning rate and the computed difference for the n-gram feature.

20. The method of claim 19, wherein the determining of the learning rate comprises computing the expression:

$$\tau = \frac{1 - w_t^T \Delta}{\| \Lambda^{-1} \Delta \|^2},$$

where $\tau$ is the learning rate;

$w_t$ is a vector of n-gram feature weights at time t;

$\Delta$ is a vector of computed differences between the first and second sets of counts;

T represents a transpose operation; and $\Lambda$ is a diagonal matrix of confidence measures on the weights for each n-gram feature in the set of n-gram features.

21. The method of claim 20, wherein the n-gram weight is adjusted according to:

$$w_{t+1} = w_t + \tau \Lambda^{-2} \Delta,$$

where t+1 represents a time after t.

22. A method for building a language model for a translation system, comprising:

providing a first relative ranking of first and second translations in a target language of a same source string in a source language;

determining a second relative ranking of the first and second translations using weights of a language model, the language model including a weight for each of a set of n-gram features;

comparing the first and second relative rankings to determine whether they are in agreement, the determination of whether the first and second rankings are in agreement comprises determining whether:

$$w_t^T \Delta \leq \text{a threshold value,}$$

where $w_t$ is a vector of the n-gram feature weights, which includes a weight for each n-gram feature in the set of n-gram features, at time t;

$\Delta$ is a vector of differences, which includes one difference per n-gram feature in the set of n-gram features for the first and second translations; and T indicates a transpose operation; and where, based on the comparison, the rankings are not in agreement, updating one or more of the weights in the language model as a function of a measure of confidence in the weight, the measure of confidence being a function of previous observations of the n-gram feature in the method.

23. A system for building a language model for a translation system comprising:

memory which stores:

a language model comprising a set of weights including a weight for each of a set of n-gram features which have been identified in a corpus of sentences in a target language;

a first ranking component which provides a first relative ranking for first and second machine translations in the target language of a same source string in a source language, based on a scoring metric;

a second ranking component which provides a second relative ranking for the first and second translations based on counts of n-gram features in each of the first and second machine translations and the weights of those n-gram features in the language model;

a comparison component which compares the first and second relative rankings and, where the first and second relative rankings are not in agreement, updates at least one of the weights in the language model for an n-gram feature identified in at least one of the first and second translations, the updating being based on a measure of confidence in the at least one weight, the confidence being a function of previous observations of the n-gram feature in the method; and a processor which implements the first ranking component, second ranking component, and comparison component.

24. A method for updating weights in a language model comprising:

a) providing a language model in memory comprising a vector of weights, one weight for each of a set of n-gram features, and a confidence measure being associated with each weight;

b) with a computer processor, for first and second translations of a same source sentence, the first translation of the source sentence being more positively ranked than the second translation of the source sentence, based on a translation scoring metric:

computing an n-gram feature vector for each of the first and second translations of the source sentence, each n-gram feature vector representing a number of occurrences in the respective translation, of n-gram features having a weight in the language model;

computing a difference vector by subtracting the n-gram feature vector of the second translation from the n-gram feature vector of the first translation;

computing a function of the difference vector and the vector of weights; and when the computed function has a value which does not at least equal a predetermined threshold:

updating the vector weights based on the difference vector and confidence measures, and updating the confidence measures to reflect observations of the n-gram features in the first and second translations; and c) repeating b) at least once with at least one of:

a different pair of first and second translations of the same source sentence; and first and second translations of a new source sentence.

25. The method of claim 24, wherein the updating of the vector weights comprises:

determining a first set of counts, each count representing a number of times a respective n-gram feature occurs in the first translation;

determining a second set of counts, each count representing a number of times the respective n-gram feature occurs in the second translation;

computing a set of differences between the counts in the first and second sets of counts;

computing a function of the set of weights and the set of differences, determining a learning rate based on a current weight of each n-gram feature identified in the first and second translations having a non-zero computed difference, the computed difference for each n-gram feature, the confidence measure for each n-gram feature weight, and optionally a positive parameter which reflects a level of noise in the identification of the more positively ranked of the translations, based on the translation scoring metric;

updating the vector weights as a function of the learning rate and the computed difference vector.

26. The method of claim 25, wherein the determining of the learning rate comprises computing the expression:

$$\tau = \frac{1 - w_t^T \Delta}{\|\Lambda^{-1}\Delta\|^2 + \frac{1}{2C}}$$

where $\tau$ is the learning rate;
w is a vector of n-gram feature weights at time t;
$\Delta$ is a vector of computed differences between the first and second sets of counts;
T represents a transpose operation;
$\Lambda$ is a diagonal matrix of confidence measures for each n-gram feature in the set of n-gram features; and
C is a positive parameter.

27. A computer program product comprising a non-transitory medium, encoding instructions, which when executed by a computer, perform the method of claim 24.

* * * * *